United States Patent Office 3,022,302
Patented Feb. 20, 1962

3,022,302
MANUFACTURE OF N,N-DISUBSTITUTED AMIDES OF ARYL ACETIC ACIDS
Olle Mårtensson, Uppsala, Sweden, assignor to Aktiebolaget Pharmacia, Uppsala, Sweden, a company of Sweden
No Drawing. Filed Mar. 8, 1957, Ser. No. 644,717
Claims priority, application Sweden Mar. 15, 1956
1 Claim. (Cl. 260—247.7)

This invention relates to manufacture of N,N-disubstituted amides of aryl acetic acids. These amides, in the form of their free bases can be represented by the general formula:

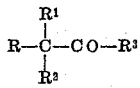

wherein R represents an aryl group, $R^1$ and $R^2$ each represents a substituent selected from the group consisting of alkyl, aralkyl, alicyclic, heterocyclic and dialkylaminoalkyl, while $R^3$ represents a substituent selected from the group consisting of dialkylamino, -N-morpholino, -N-piperidino, -N-piperazino, -N-pyrrolidino

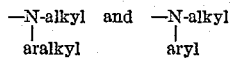

groups; said new compounds also including, when the compounds are amines, the corresponding acid addition and quaternary ammonium salts in which the substituents $R^1$ and $R^2$ become $R^1.HX$ and $R^2.HX$ respectively, and

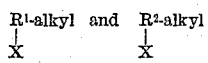

respectively where X represents the anion of an acid which may be organic or inorganic, for example a halogen atom or a sulphonic acid group.

The invention also includes a process of making the described N,N-disubstituted amides which comprises condensing, in substantially equimolecular proportions and in the presence of a strongly basic condensing agent, an aryl acetic amide of the formula $R—CHR^1—CO—R^3$ with an organic compound having the formula $R^2Y$ wherein Y represents a substituent capable, in a condensation reaction, of uniting with a labile hydrogen atom to form the compound HY, or a corresponding salt, and wherein R, $R^1$, $R^2$ and $R^3$ have their former significancies; said process also including, if desired and if the compounds are amines, a further step in which the amine-amide base is converted into the corresponding acid addition salt or the quaternary ammonium salt by reacting it, respectively, with an acid having the formula HX with the production of a group having the formula —$R^1.HX$ or —$R^2.HX$ respectively or with a low molecular alkyl ester with the production of a group having the formula

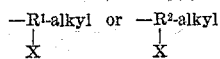

respectively, wherein X represents the anion of an acid; all as more fully hereinafter set forth and as claimed.

The preferred compounds of my invention are those in which one or both of the $R^1$ and $R^2$ substituents of the above general formula can be represented by the group —$R^4$—$R^5$, wherein $R^4$ is a low-molecular alkylene group and $R^5$ represents a substituent selected from the group consisting of lower dialkylamino, -N-piperidino and -N-morpholino, while R of the general formula represents aryl and $R^3$ represents a substituent selected from the class consisting of dialkyl amino, -N-piperidino, -N-piperazino, -N-morpholino, -N-pyrrolidino

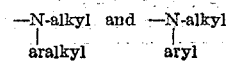

wherein the alkyl groups are low molecular. These preferred compounds can be converted into their acid addition or their quaternary ammonium compounds if desired. My process of making these preferred compounds is the same as that already described except that the $R^1$ or $R^2$ radical, or both, is represented by the group —$R^4$—$R^5$ where $R^4$ and $R^5$ have the significancies mentioned above.

During the condensation step of my process the group Y of the compound $R^2Y$ unites with and replaces the labile hydrogen atom in the alpha position of the aryl acetic amide while the group $R^2$ is substituted for the hydrogen atom thus forming the desired acid amide. Y is preferably a halogen atom and I have found that any organic halogen compound, in which the halogen is connected to a carbon atom and is the chief function in the compound, can be condensed with the aryl acetic amide in the manner stated. For this reason the range of possible compounds is large. The halogen atom may be chlorine or bromine, for example. The yields obtained in the condensation are good.

The disubstituted amides serving as starting materials for the synthesis are readily obtained in good yield, for example, from the corresponding arylacetic acids via their acid chlorides which in manner known per se are reacted with secondary amines. The aryl group may be phenyl, naphthyl or phenanthryl, for example, and may be substituted, for example, with one or more halogen atoms, such as chlorine or bromine atoms, or with alkyl or alkoxy groups, such as methyl or methoxy, for example be chlorophenyl and dimethoxyphenyl groups. In the compound $R^2Y$, which is condensed with the amide, the group $R^2$ may be isoamyl, 3,3-dimethylbutyl, cyclohexyl, benzyl, alpha-pyridyl, 2-thenyl, benzdioxan-(1.4)-methyl-(2), diethylaminopropyl, N-morpholino ethyl, N-piperidinoethyl, 2-pyridyl etc. Y is preferably a halogen atom but can be any group which is capable of reacting with the labile hydrogen atom with the formation of the compound HY or salts thereof and substitution of the group $R^2$ for the hydrogen atom which is removed.

The strongly basic condensing agent used in my process may be sodium amide, potassium amide, phenyl sodium or sodium hydride, for example. It is usually practical and advantageous to conduct the condensation reaction in the presence of an inert solvent for the reactants, for example benzene, toluene, xylene or dioxan.

The novel compounds of the present invention have been found to possess useful pharmacological properties. They are active on the nervous system. For example, some of the compounds, in which $R^1$ or $R^2$ is dialkyl-aminoalkyl, pyrrolidinoalkyl, piperidinoalkyl and morpholinoalkyl groups, have proved to be good local anaesthetics. Some compounds have spasmolytic action, other are good analgetics. Further, the compounds possess wetting properties and can be used in compositions calling for wetting agents, textile assistants etc. Some of the compounds have a germicidal action. All of the compounds are useful for absorption of ultraviolet light.

Most of the preferred amides of the present invention are in the nature of oils. But they can be converted into salts of inorganic or organic acids by reacting them with the acids in question and these salts are solids. When used for therapeutic purposes the amine-amides are preferably employed in the form of their therapeutically-acceptable acid addition or quaternary ammonium salts, such as hydrochlorides, maleates, tartrates, citrates, methoiodides, ethobromides, dimethylsulphates, etc.

The acid addition salts are prepared generally by dissolving the basic amide in a suitable solvent such as ethanol and adding an equivalent quantity of the acid. Upon dilution with a second solvent such as ether, the acid addition salt precipitates. Alternatively the basic amides may be dissolved in a solvent such as ether, and added to a solution of the acid in ether whereupon the salt so formed precipitates. The quaternary salts are conveniently prepared in benzene or ether by mixing equimolecular quantities of the basic amide and the appropriate quaternizing agent, such as methyl bromide, methyl chloride, ethyl bromide, dimethylsulphate, etc. Both the acid addition and quaternary salts can be purified by recrystallization from ethyl acetate, isopropyl acetate or mixtures of absolute alcohol and ether, for example.

My invention can be described in greater detail by reference to the following specific examples which represent practical embodiments of processes within the invention and which can be used in making the new amides.

Example 1

85.9 g. α-phenyl-α-(2-thenyl)-acetic acid diethylamide dissolved in 300 ml. dry toluene is refluxed while stirring with 12.2 g. sodium amide for about 2 hours. After cooling down the mixture to about 50° C. a dried solution of 2-(dimethylamino) ethylchloride (from 50 g. hydrochloride) in toluene is added, all at once. The mixture is then heated slowly to refluxing which is continued for about 4 hours. After cooling the reaction mixture is shaken first with water and then with diluted acid. The base is precipitated with alkali and taken up in ether. The ether solution is dried and the ether is distilled off. At a temperature of about 200° C. and a pressure of 0.1 mm. Hg a slightly yellow, viscous oil is obtained which partly solidifies. After two recrystallizations from petroleum ether white crystals are obtained having the melting point 79° C. and a composition corresponding to α-phenyl-α-(2-thenyl)-γ-dimethylaminobutyric acid diethylamide.

Example 2

53.5 g. α-allyly-phenylacetic acid diethylamide dissolved in 250 ml. dry toluene is refluxed with 9.6 g. sodium amide for 1½ hours. After cooling down to about 50° C. 36 g. 3-diethylaminopropylchloride is added and the mixture is heated to boiling. After refluxing for 4 hours the mixture is allowed to cool down to room temperature, and the water is added thereto. After shaking the mixture twice with water, the toluene layer is shaken a couple of times with diluted hydrochloric acid. From the combined hydrochloric acid solutions the base is set free with alkali and taken up in ether. The ether solution is dried and the ether is driven off. The remainder is distilled in vacuum. After renewed distillation a fraction boiling at 170–174° C. at a pressure of 0.4–0.5 mm. Hg is obtained corresponding to a yield of 57% of α-allyl-α-(3-diethylaminopropyl)-phenylacetic acid diethylamide.

Example 3

To 19.1 g. α-benzyl-phenanthryl-3-acetic acid diethylamide, dissolved in 100 ml. dry toluene is added 2.1 g. sodium amide and the mixture is refluxed for about 2½ hours. The mixture is then left to cool to 30–40° C., whereupon 7.6 g. 2-morpholinoethylchloride, dissolved in 30 ml. dry toluene, is added thereto. This reaction mixture is heated to boiling and then refluxed for about 2½ hours. After cooling down to room-temperature the toluene solution is shaken with water and then extracted with diluted hydrochloric acid. From the combined hydrochloric acid solutions the base is set free with alkali and taken up in chloroform. The chloroform solution is dried and evaporated to dryness. The remainder so obtained is recrystallized several times from a mixture of benzene and petroleum ether. The substance thus obtained forms white crystals melting at 168–170° C., and having a composition corresponding to α-benzyl-α-(2-morpholinoethyl)-phenanthryl-3'-acetic acid diethylamide.

Example 4

In exactly the same manner is prepared α-benzyl-α-(2-morpholinoethyl)-naphthyl-1-acetic acid diisopropylamide. It is a very viscous yellowish oil.

Example 5

To a solution of 7.6 g. α-(diethylaminoethyl)-α-(2-pyridyl)-phenylacetic acid morpholide in 30 ml. acetone is added 60 ml. of a c. 10 percent solution of methylbromide in acetone. After some days the precipitate formed is filtered off and washed with a mixture of acetone and ether. The monomethylammonium compound thus formed melts at 163° C. under decomposition.

Example 6

To a solution of 6.7 g. α,α-bis(dimethylaminoethyl)-phenylacetic acid diethylamide is slowly added a solution of hydrochloric acid in methyl alcohol. The precipitated bishydrochloride is recrystallized from a mixture of acetone and methyl alcohol. It melts at 267° C. under decomposition.

Example 7

Potassium amide is prepared according to a well-known method by dissolving 5.9 g. potassium in about 200 ml. liquid ammonia. A solution of 53.6 g. α-benzyl-N-n-propyl-N-benzyl-phenyl-acetic acid amide in 100 ml. dry toluene is added thereto and the contents of the flask is allowed to cool down to room-temperature. 22.5 g. β-morpholinoethylchloride, dissolved in 50 ml. dry toluene, is added thereto. The contents of the flask is heated slowly to reflux temperature and refluxed for about 2 hours. After the reaction mixture has cooled down to room-temperature, the toluene solution is first shaken with water and then with diluted hydrochloric acid. From the combined hydrochloric acid solutions the base is precipitated in the form of a viscous oil. This oil is taken up in ether, and the ether solution is dried. After removal of the solvent, a viscous slightly yellow oil (33.5 g.) remains which crystallizes. After recrystallization from cyclohexane the morpholino compound so obtained melts at 137.5–139° C.

Example 8

In addition to the compounds, the preparation of which has been described above, the following compounds have been produced, among others, using the same general procedure:

| Compound | Properties |
|---|---|
| α-benzyl-α-(2-dimethylaminoethyl)-phenylaceticaciddimethylamide | B.P. 165–170° C., 0.25 mm. Hg. |
| α-benzyl-α-(2-diethylaminoethyl)-phenylaceticaciddiethylamide | 190–200° C., 0.5 mm. Hg. |
| α-(3,3-dimethylbutyl)-α-(2-dimethylaminoethyl)-phenylaceticaciddiethylamide | 146–150° C., 0.1–0.2 mm. Hg. |
| α-(3,3-dimethylbutyl)-α-(3'-diethylaminopropyl)-phenylaceticaciddiethylamide | 158–160° C., 0.2 mm. Hg. |
| α-cyclohexyl-α-(2-morpholinoethyl)-phenylaceticaciddiethylamide | M.P. 114–115° C. |
| α-cyclohexyl-α-(3-diethylaminopropyl)-phenylaceticaciddiethylamide | B.P. 166–171° C., 0.2 mm. Hg. |
| α,α-bis(2-dimethylaminoethyl)-phenylaceticaciddiethylamide | 137–139° C., 0.1–0.2 mm. Hg. |
| α-(p-chlorophenyl)-α-(2-pyridyl)-γ-(dimethylamino)-butyricaciddiethylamide | 205–210° C., 1.2 mm. Hg. M.P. 85–87° C. |
| α-(2-dimethylaminoethyl)-α-(2'-pyridyl)-phenylacetic acid pyrrolidide | B.P. 193–195° C., 0.1 mm. Hg. |
| α-(2-morpholinoethyl)-α-(2'-pyridyl)-p-chlorophenylacetic acid dimethylamide | M.P. 124–125.5° C. |
| α-(2-diethylaminoethyl)-α-(2'-pyridyl)-phenylacetic acid diisopropylamide | B.P. 170–172° C., 0.2 mm. Hg. |
| α-(2-diethylaminoethyl)-α-(2'-pyridyl)-phenylacetic acid morpholide | 205–207° C., 0.2 mm. Hg. |
| α-allyl-α-(2-dimethylaminoethyl)-phenylacetic acid diethylamide | 124–130° C., 0.1–0.2 mm. Hg. |
| α-(2-diethylaminoethyl)-α-ethyl-phenylacetic acid diisopropylamide | 153–155° C., 0.8–1.0 mm. Hg. |
| 2-ethyl-2-phenyl-butandiacid(1,4)-1-diisopropylamide-4-piperidide | M.P. 126–127° C. |
| α-(2-dimethylaminoethyl)-α-phenoxy phenylacetic acid diethylamide | B.P. 150–155° C., 0.1 mm. Hg. |
| α-benzyl-α-diethylamino-phenylacetic acid diethylamide | M.P. 108–109° C. |
| α-diethylamino-α-(3-diethylaminopropyl)-phenylacetic acid diethylamide | B.P. 150–152° C., 0.1–0.2 mm. Hg. |

What I claim is:

α - benzyl - α - (2 - morpholinoethyl) - N - n - propyl-N-benzyl-phenyl-acetic acid amide.

References Cited in the file of this patent

UNITED STATES PATENTS

| | | |
|---|---|---|
| 2,098,954 | Dalmer et al. | Nov. 15, 1937 |
| 2,529,521 | Sperber et al. | Nov. 14, 1950 |
| 2,555,353 | Lucas et al. | June 5, 1951 |
| 2,585,550 | Hoffmann et al. | Feb. 12, 1952 |
| 2,608,558 | Surrey et al. | Aug. 26, 1952 |
| 2,782,206 | Aspergren et al. | Feb. 19, 1957 |
| 2,823,233 | Speeter | Feb. 11, 1958 |
| 2,841,589 | Brandstrom et al. | July 1, 1958 |

OTHER REFERENCES

Jour. Org. Chem., vol. 17, pages 770–777 (1952).

Cheney et al.: Jour. of Org. Chem., vol. 17, pages 774–75 (1952).

Janssen et al.: Archives Internationles de Pharmacodynamie et de therapie, vol. 103, pages 82–99 (1955).

Wheatley et al.: J. Org. Chem., vol. 19, pages 794–800 (1954).